US007327371B2

(12) United States Patent
Nakamura et al.

(10) Patent No.: US 7,327,371 B2
(45) Date of Patent: Feb. 5, 2008

(54) GRAPHIC CONTROLLER, MICROCOMPUTER AND NAVIGATION SYSTEM

(75) Inventors: Atsushi Nakamura, Kodaira (JP); Kenichiro Omura, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 534 days.

(21) Appl. No.: 10/716,459

(22) Filed: Nov. 20, 2003

(65) Prior Publication Data

US 2004/0113904 A1 Jun. 17, 2004

(30) Foreign Application Priority Data

Dec. 13, 2002 (JP) ............................ 2002-361971

(51) Int. Cl.
*G06T 1/60* (2006.01)
*G09G 5/39* (2006.01)
*G09G 5/399* (2006.01)
*G06F 13/28* (2006.01)
*G06F 3/038* (2006.01)

(52) U.S. Cl. ..................... 345/530; 345/204; 345/531; 345/533; 345/539

(58) Field of Classification Search ................ 345/204, 345/539, 530, 531, 533
See application file for complete search history.

(56) References Cited

U.S. PATENT DOCUMENTS 4,757,455 A * 7/1988 Tsunoda et al. ............ 701/208
4,935,815 A * 6/1990 Ichikawa et al. ........... 348/448
5,387,945 A * 2/1995 Takeuchi .................... 348/564
5,388,207 A * 2/1995 Chia et al. .................. 345/548
5,430,464 A * 7/1995 Lumelsky ................... 345/555
5,657,478 A * 8/1997 Recker et al. ............. 345/503
5,664,163 A * 9/1997 Yutaka et al. .............. 345/522
5,850,224 A * 12/1998 Sakuraba .................... 345/422
5,889,499 A * 3/1999 Nally et al. .................... 345/7
6,005,572 A * 12/1999 Kurihara ..................... 345/531
6,894,692 B2 * 5/2005 Schinnerer .................. 345/539
6,933,942 B2 * 8/2005 Tamai ........................ 345/505

OTHER PUBLICATIONS

"SuperH™ RISC engine Peripheral LSI HD64413A Q2SD User's Manual", Electronic Devices Sales & Marketing Group Semiconductor & Integrated Circuits, Hitachi, Ltd., May 2000, pp. 37-39.

* cited by examiner

*Primary Examiner*—Kee M. Tung
*Assistant Examiner*—Roberta Prendergast
(74) *Attorney, Agent, or Firm*—Reed Smith LLP; Stanley P. Fisher, Esq.; Juan Carlos A. Marquez, Esq.

(57) ABSTRACT

Image data storage areas of a plurality of pages are allocated for each of a plurality of display planes capable of superimposed display, and display output processing is performed while switching between the image data storage areas is being performed for each display plane. In such a display system, versatile switching between image data storage areas is enabled without heavily loading a central processing unit. Attribute bits of a TRAP command indicating the termination of drawing of one display plane are provided with display switching enable bits indicating whether to perform switching between image data storage areas for each display plane. For display planes corresponding to the display switching enable bits of "1", switching to an image data storage area from which image data is read is performed at timing synchronous with a next vertical synchronous signal.

11 Claims, 9 Drawing Sheets

FIG. 3

DRAWING ATTRIBUTE REGISTER

201

| | |
|---|---|
| 0 | AUTOMATIC SWITCHING MODE ENABLE D0 |
| 1 | AUTOMATIC SWITCHING MODE ENABLE D1 |
| 2 | AUTOMATIC SWITCHING MODE ENABLE D2 |
| 3 | AUTOMATIC SWITCHING MODE ENABLE D3 |
| 4 | AUTOMATIC SWITCHING MODE ENABLE D4 |
| 5 | AUTOMATIC SWITCHING MODE ENABLE D5 |
| 6 | AUTOMATIC SWITCHING MODE ENABLE D6 |
| 7 | AUTOMATIC SWITCHING MODE ENABLE D7 |
| 8 | |
| ⋮ | ⋮ |
| 26 | |
| 27 | |
| 28 | |
| 29 | |
| 30 | |
| 31 | |

GRAPHIC CONTROLLER, MICROCOMPUTER AND NAVIGATION SYSTEM

BACKGROUND OF THE INVENTION

The present invention relates to technology effectively applied to a display control device that superimposes plural display faces to make display output, and more particularly to technology effectively used for a navigation system that displays a current position on a map.

A display system that makes a display on a liquid crystal display panel and the screen of a CRT (Cathode Ray Tube) display device generally has a frame memory for storing image data containing pixel data of one screen. The display system makes display output as follows. While pixel data of display dots is written to the frame memory by using a drawing processor or the like, a display processing circuit successively reads the pixel data from the frame memory, converts the pixel data into display signals synchronously with vertical synchronous signals of the display device, and outputs the display signals.

In some display systems, a frame memory as described above is provided for two screens so that drawing, and display output are performed through alternate switching between an area to which image data is written and an area from which image data is read for display output. By thus using the frame memory of two screens, time room is obtained between image data writing processing and display output processing, and screen flicker can be avoided which occurs as a result of the execution of display output when image data is being written.

In other some display systems having a frame memory capable of storing image data of two screens, if display contents do not need to be updated over plural display frame periods, without switching between a memory area to which image data is written and a memory area from which image data is read, display output is made by repeatedly using image data of an identical memory area. Furthermore, some display systems have an automatic switching function (automatic rendering mode) that, when it has become possible to update display contents at the termination of drawing processing for a next screen, automatically switches between a memory area to which image data is written and a memory area from which image data is read at appropriate timing. Such an automatic switching function is achieved, for example, in such a way that, when a drawing circuit fetches a predetermined command (instruction) indicating the termination of drawing processing for one screen, the drawing circuit notifies a display processing circuit of the termination of the drawing processing and the display processing circuit switches the memory area to a memory area from which image data is read in step with a synchronous signal of a display device (e.g., Non-patent Publication 1).

[Non-patent Publication 1]

"SuperH RISC engine Peripheral LSI HD64413A Q2SD User's Manual", Electronic Devices Sales & Marketing Group Semiconductor & Integrated Circuits Hitachi, Ltd., May 2000, pages 47 to 49

SUMMARY OF THE INVENTION

In recent years, various display systems have been demanded to perform display control in a manner that provides plural display faces (referred to as display planes or layers, hereinafter referred to as display planes) on a display screen, and displays contents with the display planes superimposed. Such display control is achieved by providing a memory area (hereinafter referred to as an image data storage area) for storing image data for each of display planes, superimposing image data written to image data storage areas of plural display planes in line with the display positions of the display planes, and converting the superimposed image data into display signals. Such display systems have the drawback of being more liable to flicker in screen output because of less time for writing image data, in comparison with when no display is made in a superimposed form. To avoid the drawback, high-speed processors are required, contributing to higher costs.

Accordingly, the inventor et al. had the idea of performing control in a manner that allocates image data storage areas of two pages on a display memory for each display plane and alternately switches between an image data storage area to which image data is written and an image data storage area from which image data is read for display output. However, in such a switching control method, various cases are considered such that it is useful to concurrently perform switching of the image data storage area with respect to a plurality display planes depending on display contents, or it is useful to perform switching at different timing for each of the display planes. Therefore, switching between the image data storage areas with uniform pattern cannot cover various display processings.

Since switching between image data storage areas must be performed synchronously with a vertical synchronous signal VSYNC of a display device, an attempt to force a CPU (Central Processing Unit) to perform switching control at different timings for plural display planes will heavily load the CPU and reduce the throughput of the whole system. Yet, in a navigation system, since a high-performance CPU cannot be used in the interest of reduction in costs and the load of the CPU cannot be increased for display control, the above-described switching control must be performed without increasing the load of the CPU.

An object of the present invention is to provide a display system that makes display output with plural display planes superimposed and is capable of eliminating display flicker without using a high-performance processor, and furthermore a display system that makes display output with plural display planes superimposed and is capable of versatile and redundancy-free, optimum switching between image data storage areas.

Another object of the present invention is to provide a display system that is capable of switching between image data storage areas for display planes without heavily loading a CPU responsible for system control.

The foregoing and other objects, and novel features of the present invention will become apparent from this specification and the accompanying drawings.

Representative examples of the invention disclosed in the present application will be briefly described below.

In a display system that is capable of display output with plural display planes superimposed and is provided with image data storage areas capable of storing image data of plural units (plural pages) for each display plane, attribute bits of a first instruction (e.g., TRAP command) indicating the termination of expansion of image data of one display plane are provided with display switching enable bits (D0 to D7) indicating whether to perform switching between image data storage areas for each display plane. For display planes corresponding to the display switching enable bits (D0 to D7) of "1", switching to an image data storage area from which image data is read is performed at timing synchronous with a next vertical synchronous signal.

According to such means, since switching to an image data storage area from which image data is read can be performed independently for each of the display planes, even in cases where the updating of display contents is performed differently for different display planes, redundancy-free, optimum switching can be performed. Since the switching setting of an image data storage area can be performed during image data expansion processing by use of a command interpreted and executed within a display control device, switching between image data storage areas can be controlled without increasing the load of the CPU and the like.

BRIEF DESCRIPTION OF THE DRAWINGS

FIG. 3 is a diagram showing part of a drawing attribute register provided in a drawing unit of FIG. 1;

DESCRIPTION OF THE PREFERRED EMBODIMENTS

Hereinafter, preferable embodiments of the present invention will be described with reference to the drawings.

Figure 1:
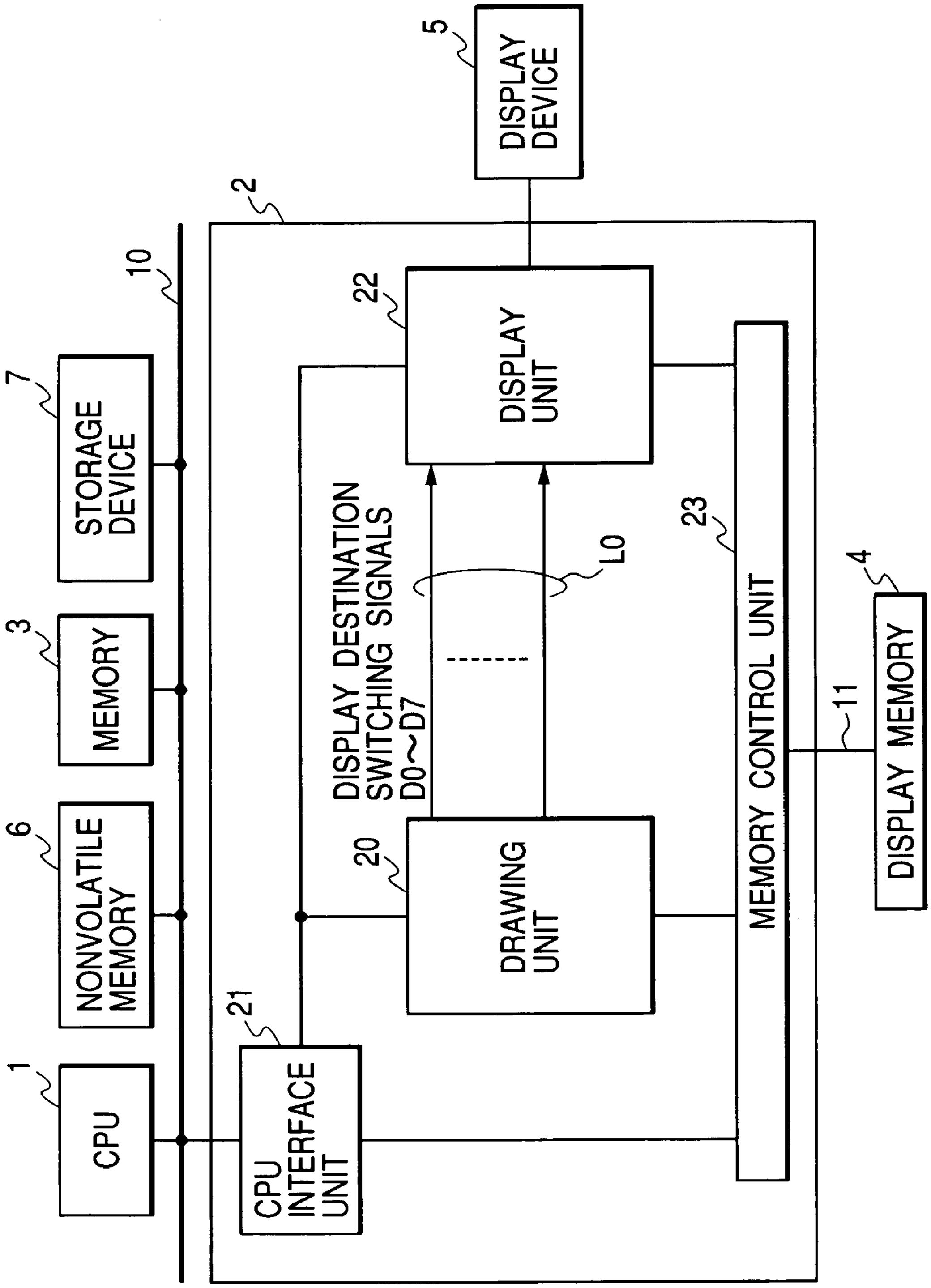
FIG. 1 is a block diagram showing the overall configuration of a car navigation system to which the present invention is applied.

FIG. 1 is a block diagram showing details of the whole and main portions of a car navigation system to which the present invention is applied. Although there is no particular limitation, in the drawing, plural circuit blocks within an area indicated by a reference numeral 2 are formed on one semiconductor board such as a monocrystalline silicon.

The car navigation system of this embodiment comprises: a CPU (central processing unit) 1 that performs system control such as the determination of a current position based on position information from measuring apparatuses, processing for user input, and instructions for display output; a display control device 2 that performs drawing processing for writing image data to a display memory 4 according to drawing commands (drawing instruction) produced by the CPU 1 and display output processing for converting the image data read from the display memory 4 into display signals and displaying them; a memory 3 such as DRAM (Direct Random Access Memory) for providing a work memory space to the CPU 1; the display memory 4 such as DRAM for storing drawing commands and image data; a display device 5 such as a liquid crystal display; a nonvolatile memory 6 capable of holding data even after power off, such as a flash memory and a mask ROM (Read Only Memory) for storing an activation program and the like; a storage device 7 in which high-capacity storage media such as DVD (digital versatile disc) and hardware disk storing map data and the like are mounted; a system bus 10; and a display memory bus 11.

Although not shown in the drawing, to the system bus 10 are connected an input device such as a touch panel, and measuring apparatuses for measuring a current position such as a GPS (global positioning system) receiver, a direction measuring apparatus, and a gas rate sensor. The above-described map data may not be stored in the storage device 7 but be received from a computer network through communication means.

The car navigation system of this embodiment is configured to make display output by superimposing plural display planes on which different types of displays such as, e.g., global map display, detailed map display, and menu display are made. The CPU 1 generates a series of drawing commands (hereinafter referred to as a display list) for expanding image data on the display memory 4 according to display contents for each of display planes, and stores the series of drawing commands in the display memory 4. Based on specification of a display list from the CPU 1 and an instruction to start drawing, a drawing unit 20 of the display control device 2 reads drawing commands from the specified display list for execution and expands image data in a specified image data storage area of a display plane. In this embodiment, a display list is followed by a TRAP command, which is a first instruction to indicate the end of drawing. Upon reading the TRAP command, the drawing unit 20 stops the drawing processing, outputs an interrupt signal to the CPU 1, and waits for the next instruction to start drawing from the CPU 1.

In the display memory 4, image data storage areas are allocated for each of display planes, and image data of display planes corresponding to the image data storage areas is expanded by the drawing unit 20. In this embodiment, for one display plane, image data storage areas of plural pages (e.g., 2 pages, 3 pages, etc.) are provided. The drawing unit 20 has a drawing destination address register for storing the start address of an image data storage area of a drawing destination. The CPU 1 sets the start address of an image data storage area used for drawing from among image data storage areas of plural pages of plural display planes in the drawing destination address register to start drawing processing and thereby can expand image data in the image data storage area of a specified page of a specified display plane.

Figure 2:
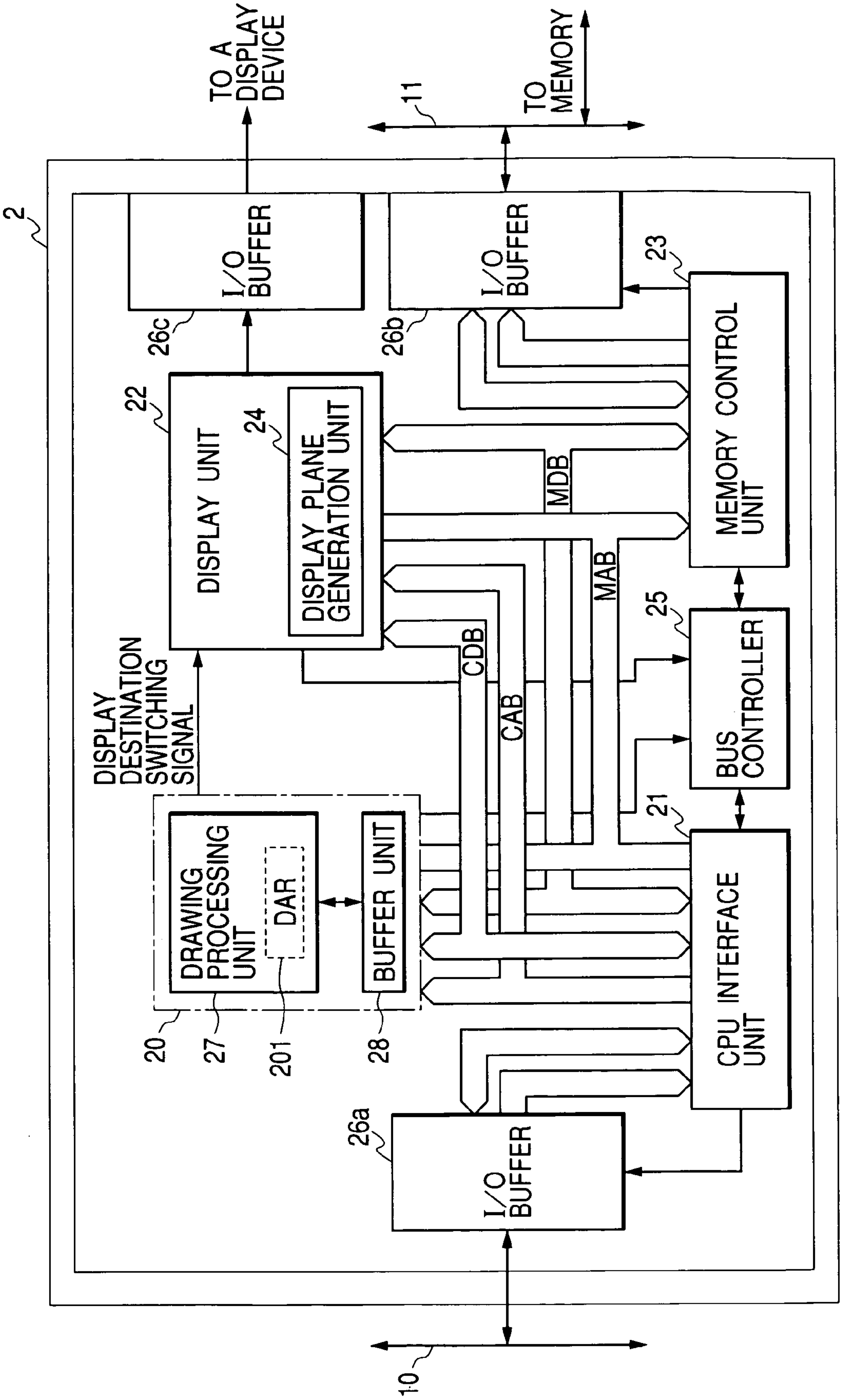
FIG. 2 is a block diagram showing details of a display control device of FIG. 1.

FIG. 2 shows a more detailed block configuration of the display control device 2.

The display control device 2 comprises: a drawing unit 20 including a drawing processing unit 27 for interpreting and executing drawing commands, and a buffer unit 28; a CPU interface unit 21, connected to the system bus 10, through which data is inputted from and outputted to the CPU 1; a display unit 22 that reads pixel data of plural display planes from the display memory 4, superimposes the pixel data on top of each other, converts the superimposed pixel data into video signals, and outputs the video signals; and a memory control unit 23 that controls the reading and writing of data from and to the display memory 4.

The display control device 2 is provided with: memory buses MDB and MAB over which data and addresses of the display memory 4 are transferred; CPU buses CDB and CAB over which data and addresses of the system bus 10 side are transferred; and a bus controller 25 that controls access of the blocks to these buses. The CPU interface unit 21, the display unit 22, and the memory control unit 23 input and output data through I/O buffers 26*a* to 26*c*, respectively, and the drawing processing unit 27 fetches drawing commands and writes pixel data through the buffer unit 28.

The display unit 22 is provided with a display plane generating unit 24 that reads image data of a specified page of each display plane from the display memory 4 in step with display timing, superimposes pixel data of different display planes in the display positions of the display planes, converts the pixel data into display signals, and outputs the display signals. The drawing processing unit 27 is provided with various registers such as a drawing attribute register (DAR) 201, a control register, and a status register.

FIG. 3 shows the format and partial functions of the drawing attribute register 201 provided in the drawing processing unit 27.

The drawing processing unit 27 sequentially reads and executes drawing commands from a display list for each display, generated by the CPU 1 and stored in the display memory 4. However, to globally set drawing attributes for plural drawing commands, the drawing processing unit 27 is internally provided with the drawing attribute register 201 as described previously, and the drawing commands are executed according to attribute contents set in the drawing attribute register 201. Drawing commands decodable by the display control device 2 of this embodiment also contain a drawing attribute value. If an attribute value set in the drawing attribute register 201 and a drawing attribute value contained in individual drawing commands are different from each other, one of them is selected according to a value set in advance in a control register or the like not shown.

The drawing attribute register 201, as shown in FIG. 3, are provided with eight automatic switching mode enable bits D00 to D07 indicating whether to permit or not automatic display switching control for each of plural (e.g., eight) display planes. The automatic display switching control, though detailed later, refers to control processing that, after the termination of drawing processing for one display plane, switches a page of an image data storage area from which image data is read for display output to the next page from the next display frame period, based on display switching enable bits D0 to D7 described later.

To the drawing attribute register 201, the CPU 1 may directly write an attribute value, or the drawing processing unit 27 may write an attribute value by a control command interpretable to it.

The above-described automatic switching mode enable bits D00 to D07, instead of being included in the drawing attribute register 201 of the drawing processing unit 27, may be included in, for example, a display register provided in the display unit 22, or the drawing processing unit 27 or a setting register external to the display unit 22.

Figure 4:
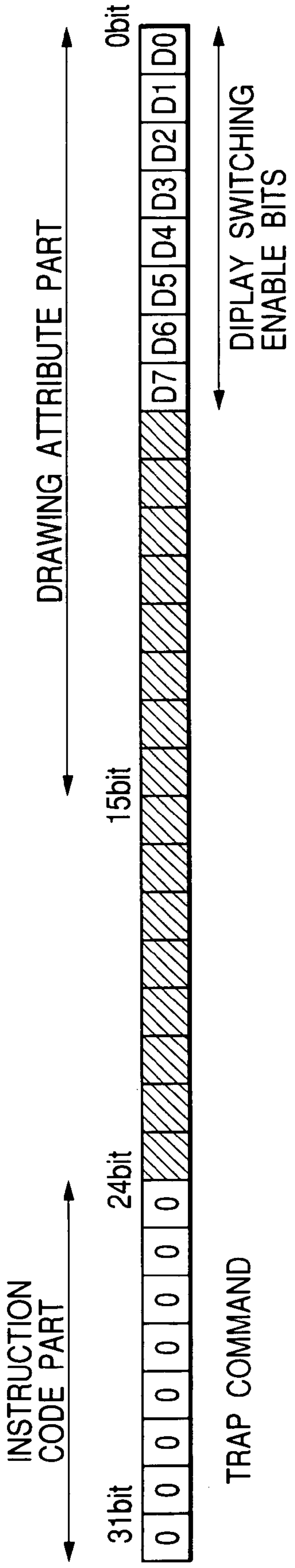
FIG. 4 is a diagram showing the bit configuration of a TRAP control command of an embodiment.

FIG. 4 is a diagram showing the bit configuration of a TRAP control command for specifying the termination of drawing processing for one display plane.

A display list stored in the display memory 4 includes not only drawing commands for drawing lines and polygons but also a control command for writing values to the drawing attribute register 201, a control command for terminating drawing, and other control commands.

The TRAP command specifies the termination of processing of a display list generated for each display plane. The drawing processing unit 27, according to the TRAP command, sets a predetermined bit of a control register for controlling the operation of, e.g., the drawing processing unit 27 at "0" to stop the operation of the drawing processing unit 27, sets a predetermined bit of the status register at "1" to output an interrupt signal to the CPU 1, and thus notifies the CPU 1 of the termination of the drawing processing.

In the display control device 2 of this embodiment, as shown in FIG. 4, a drawing attribute part of the TRAP command for terminating drawing processing is provided with display switching enable bits D0 to D7 for switching an image data storage area from which image data is read of each display plane to the next page. The display switching enable bits D0 to D7 are used to control switching between image data storage areas of display planes.

Figure 5:
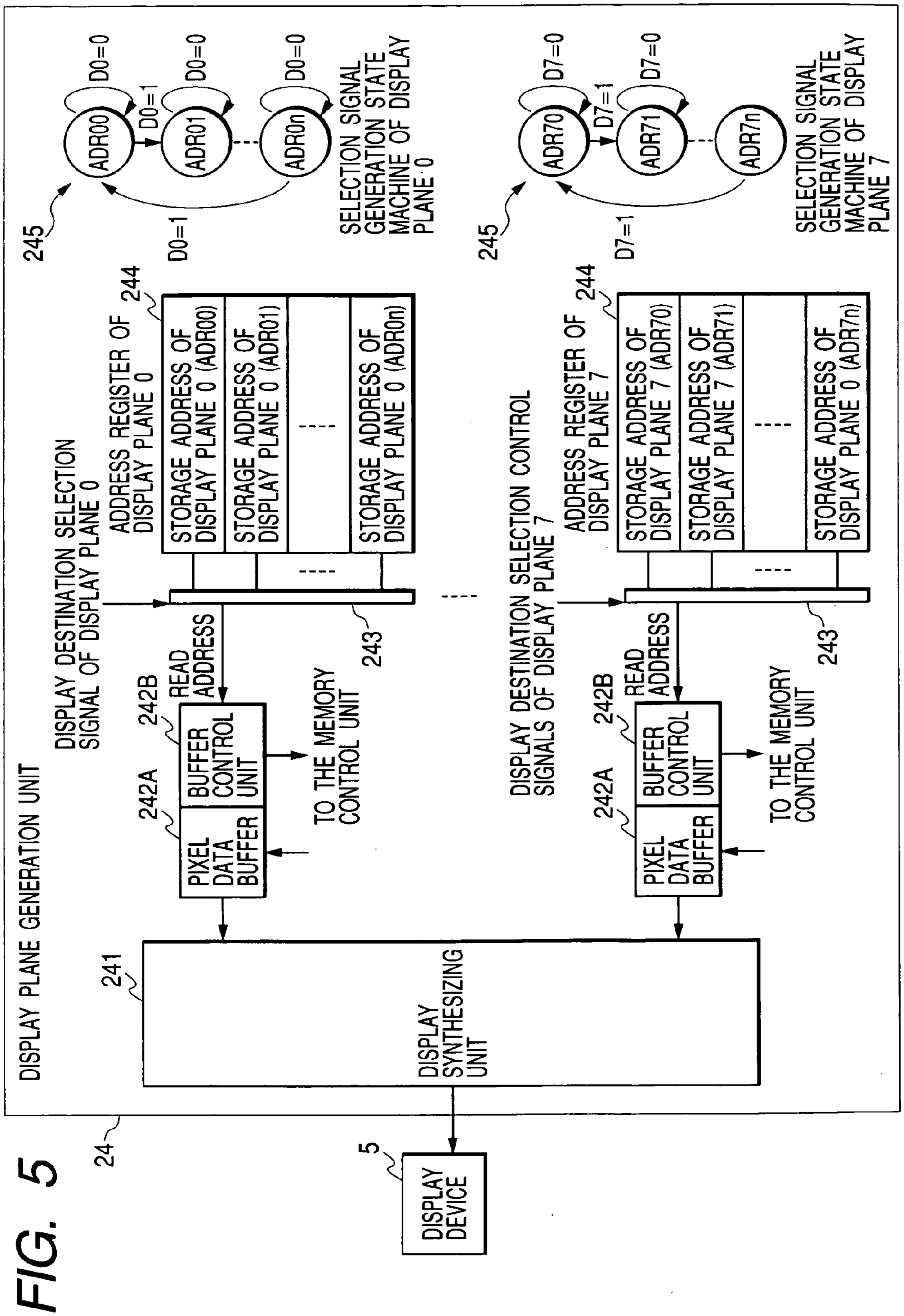
FIG. 5 is a drawing showing a rough configuration of a display plane generating unit of FIG. 1.

FIG. 5 is a drawing showing a rough configuration of the display plane generating unit 24 included in the display unit 22.

The display plane generating unit 24 is provided with: one display synthesizing unit 241 that processes pixel data to obtain an image with images of plural display planes superimposed; and plural groups (e.g., eight) of display plane processing units respectively provided correspondingly to plural display planes. Each display plane processing unit includes: pixel data buffers (line buffers) 242A; buffer control units 242B; selection circuits 243; display address registers 244; and selection signal generation state machines 245 as first registers.

The display synthesizing unit 241, based on information about a blend ratio of pixel data of display planes set in an attribute register not shown and a vertical position relationship among the display planes, performs operations for superimposing pixel data inputted from plural pixel data buffers 242A and outputs the superimposed pixel data. The outputted pixel data is converted into analog display signals before being outputted to the display device 5, so that display output is made in a form that superimposes plural display planes in a predetermined position. The blend ratio of one to zero produces display output that wholly hides a lower plane by an upper plane. The blend ratio of, e.g., three to one produces display output that brings a lower plane into a slight transparent view. It may be selected which of logical operations such as OR, AND, and Ex-OR should be used for image superimposing.

The pixel data buffers 242A are buffer memories sized to be capable of storing a fraction of, e.g., pixel data of one display line.

The buffer control units 242B count high-frequency clock signals internally generated synchronously with a vertical synchronous signal VSYNC of the display device 5, read pixel data in a display position of a corresponding display plane from the display memory 4 so that the pixel data is outputted to the display synthesizing unit 241 at timing appropriate for the display position, and store the pixel data in the pixel data buffers 242A for output.

The display address registers 244 each store the start addresses (display information) of image data storage areas of plural pages for a corresponding display plane. When the number of display planes changes or the size of a display plane is changed, the start addresses of image data storage areas changed accordingly are written to the display address register 244*s* by the CPU 1. Preferably, the values of the display address registers 244 are updated on the falling edge of a vertical synchronous signal VSYNC of the display device 5.

The selection circuits 243 selectively feed one of plural start addresses stored in the display address registers 244 to the buffer control units 242B according to a display destination selection control signal described later. Based on the start address, the buffer control units 242B can read image data of any of plural pages of image data storage areas.

The selection signal generation state machines 245 point to one of image data storage areas of plural pages allocated for a corresponding display plane. At timing (e.g., on the falling edge of the synchronous signal VSYNC) synchronous with the vertical synchronous signal VSYNC of the display device 5, a signal indicating a page of an image data storage area used at that time is outputted to the selection circuits 243. This signal serves as a display destination selection control signal of the selection circuits 243.

The state machines 245 receive a bit of a corresponding display plane of the display switching enable bits D0 to D7 of the TRAP command, and when its value is "1", cause the state to transition to point to the next page; when "0", cause no state transition to continue to point to the same page as a previous one. Pages pointed to are shifted in the same order as a page order in which drawing processing is performed. The above-described display switching enable bits D0 to D7 are sent from the drawing unit 20 to the display unit 22 over signal lines L0 and inputted to the selection signal generation state machines. The state machines 245 can consist of, e.g., a shift register and logical circuits for identifying signals and performing other operations.

Even if a display switching enable bit D0 to D7 of a corresponding display plane is "1", if the value of a corresponding display plane of the automatic switching mode enable bits D00 to D01 set in the drawing attribute register 201 is "0", no state transition is made.

In this way, according to an enable bit D0 to D7 outputted at the termination of drawing of one display plane, the selection signal generation state machine 245 of the display plane causes transition, and pages of the display plane are switched synchronously with the vertical synchronous signal VSYNC.

By the selection signal generation state machines 245, the display address registers 244, the selection circuits 243, the pixel data buffers 242A, and the buffer control units 242B, image data is read from one of image data storage areas of plural pages associated with individual display planes and subjected to display output processing, and whether or not a page for display output in the next display frame is switched, based on the display switching enable bits D0 to D7 of the TRAP command, is determined for each of display planes so that page switching control can be performed independently for each of the display planes.

Next, drawing processing and display switching control by the display control device 2 configured as described above will be described in detail using several patterns as examples.

Figure 6:
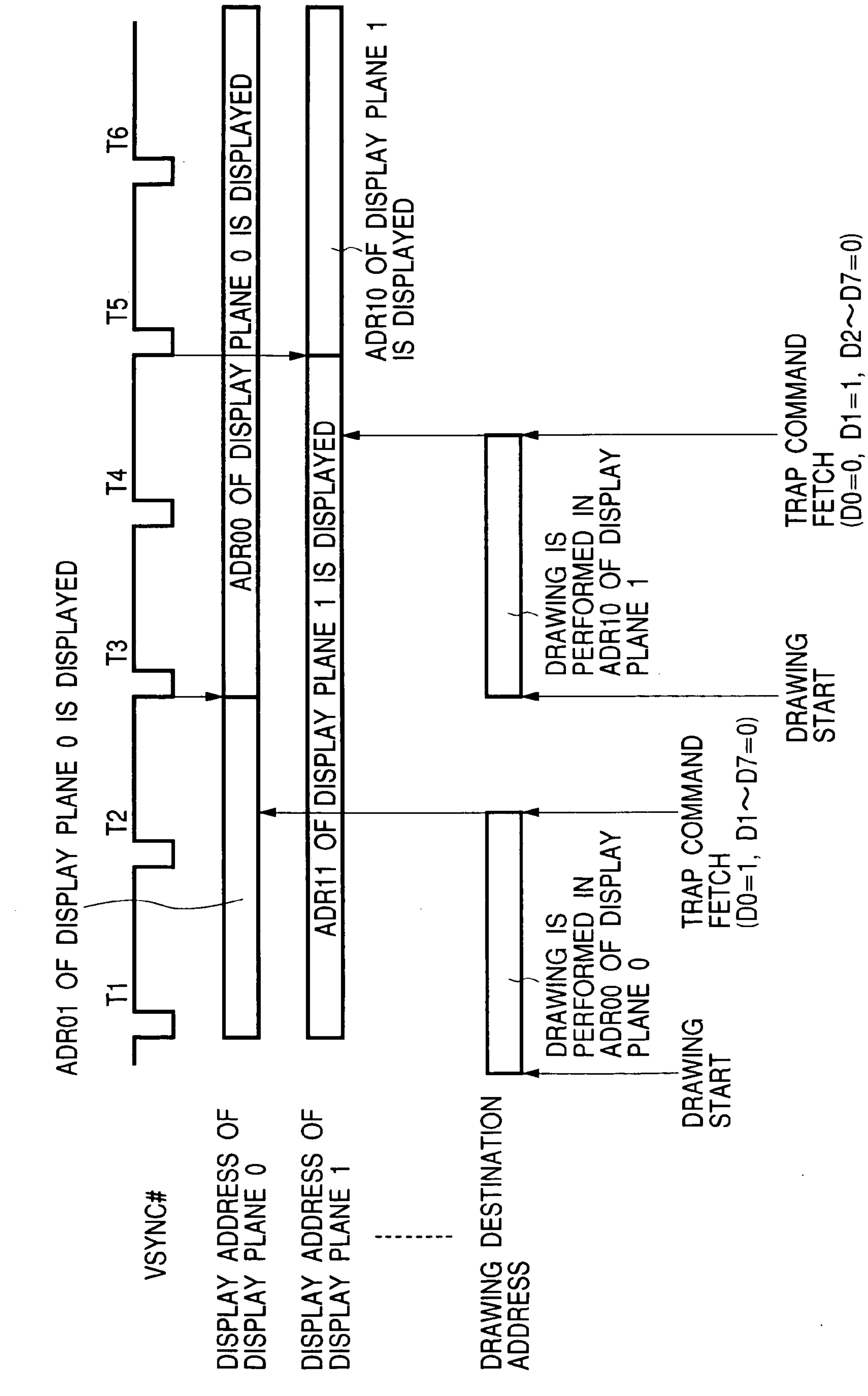
FIG. 6 is a time chart showing a first operation example of drawing processing and display switching.
Figure 7:
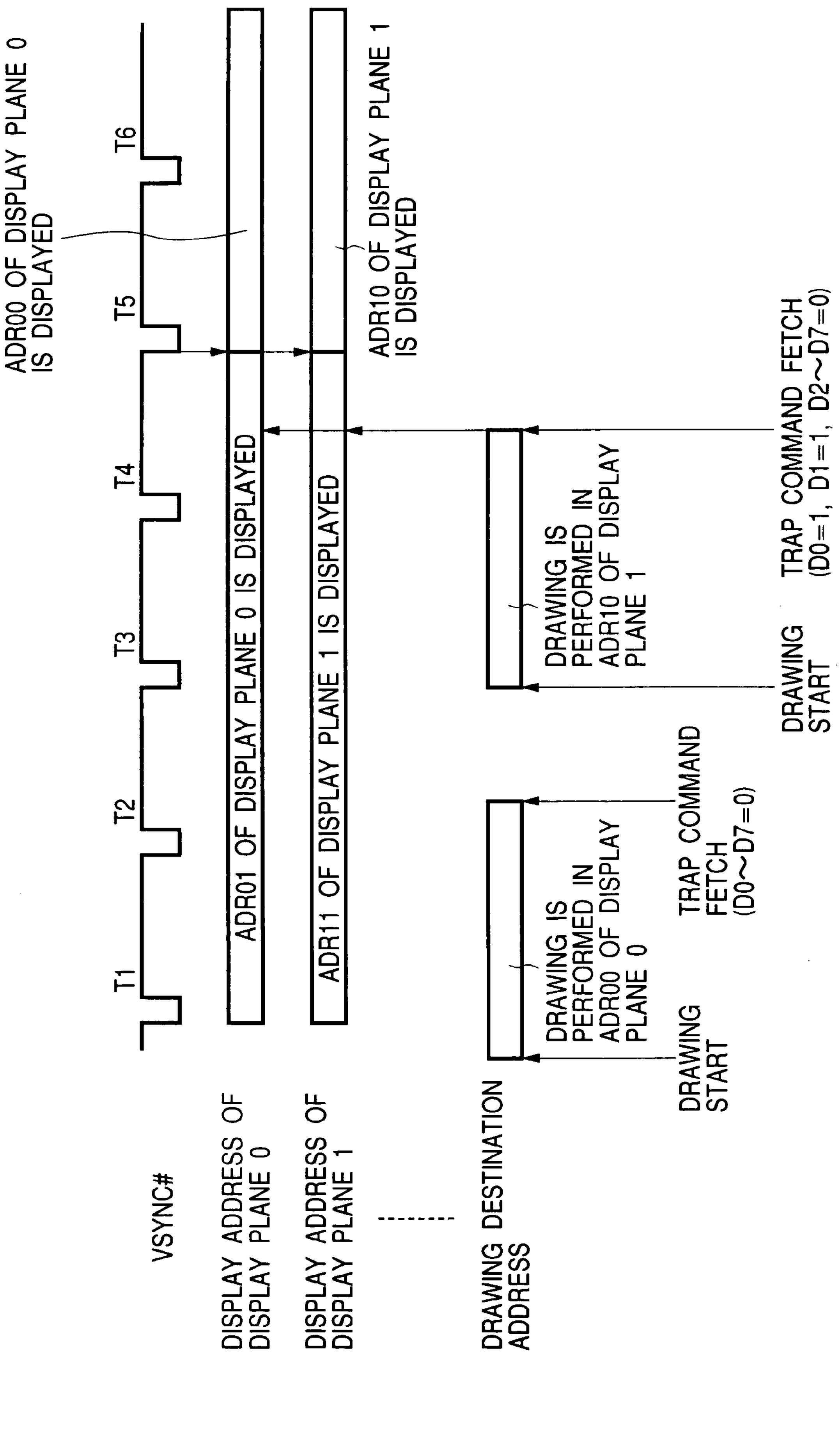
FIG. 7 is a time chart showing a second operation example of drawing processing and display switching.
Figure 8:
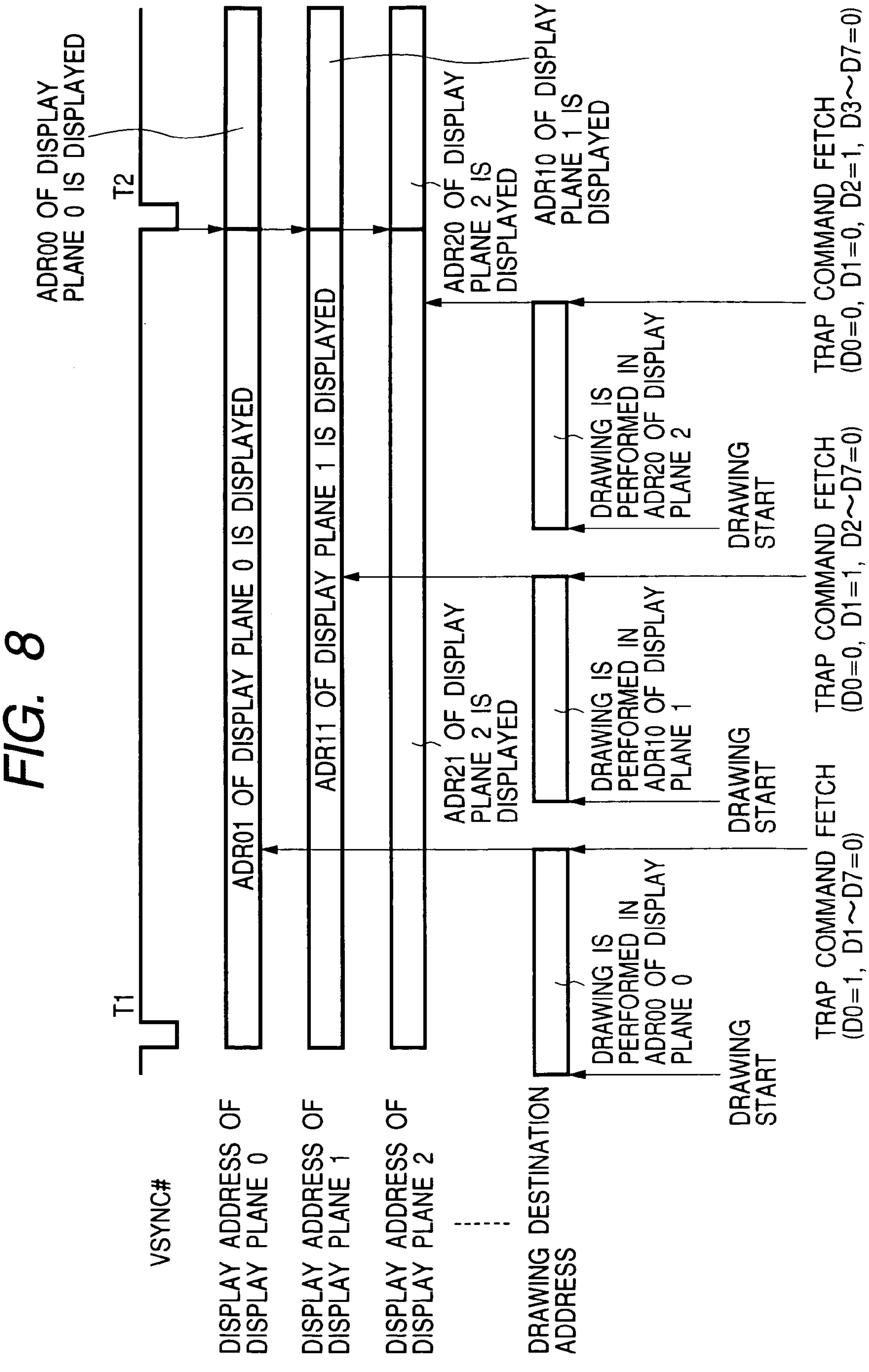
FIG. 8 is a time chart showing a third operation example of drawing processing and display switching.

FIGS. 6 to 8 are time charts of first to third examples for explaining drawing processing and display switching timing. In the drawings, VSYNC designates a vertical synchronous signal of the display device 5. In the timing charts of FIGS. 6 to 8, it is assumed that image data storage areas of two pages are allocated per display plane.

In a display system of this embodiment, the setting of switching to a page from which image data is read for display output is performed independently for each of display planes by a TRAP command executed at the termination of drawing of any one display plane. After the switching setting, actual switching to the page from which image data is read is performed at timing synchronous with the vertical synchronous signal VSYNC of the display device 5.

According to a control pattern shown by the time chart of FIG. 6, at the termination of drawing processing for a first display plane "0", page switching setting of the first display plane "0" is performed, and at the termination of drawing processing for a second display plane "1", page switching setting of the second display plane "1" is performed.

In such a control pattern, in the period of display frames T1 and T2 during which drawing is performed in an image data storage area with the start address "ADR00" of a first display plane "0", image data is read for display from an image data storage area of its start address "ADR01" in which drawing has already terminated. In the period of display frames T3 to T6 started after page switching setting at the termination of drawing processing, image data of an image data storage area of its start address "ADR00" is read and displayed.

The same is also true for a second display plane "1". In display frames T1 to T4 during or before drawing to an image data storage area of its start address "ADR10", display output processing is performed for an image data storage area of "ADR11" in which drawing has already terminated. In the period of display frames T5 to T6 started after page switching setting at the termination of drawing processing, display output processing is performed for the image data storage area of "ADR10" in which drawing terminated previously.

Such a control pattern that performs page switching setting for display frames in which drawing has terminated is effectively applied when the display is to be updated immediately after the termination of drawing.

According to a pattern shown by the time chart of FIG. 7, page switching setting is not performed at the termination of drawing of the first display plane "0", and at the termination of drawing of the second display plane "1", page switching setting of 0-th and first display planes is performed.

In this pattern, no read page switching takes place in display frames T3, T4 after termination of drawing of the first display plane "0", and page switching of the first display plane "0" and that of the second display plane "1" are performed at the same time from a display frame T5 started after termination of drawing of the second display plane "1".

Such a control pattern is useful for concurrent switching of the displays of plural display planes.

According to a control pattern shown by the time chart of FIG. 8, page switching setting is performed for display planes in which drawing has terminated. The time chart shows a case where drawing processing of plural display planes terminated during the period of one display frame T1.

In such a case, since page switching setting is performed for each of first to third display planes during the period of the display frame T1, the displays of the first to third display planes are switched at the same time in the next display frame T2.

In such a control pattern, for example, if the time of drawing processing is prolonged with the result that the drawing termination timing of the third plane "2" extends to the period of the display frame T2, only the displays of the first display plane "0" and the second display plane "1" are switched at the same time and the display of the third display plane "2" is switched in the next display frame.

As explained hereinbefore, according to the display system of this embodiment, since switching to a page for display output can be performed independently for each of display planes, display switching can be performed only for updated display planes as in cases where display contents have been updated only in some of display planes, enabling redundancy-free, optimum display processing. Switching of the displays of plural display planes at the same timing can be covered by the control pattern shown in FIG. 7.

It is said that display output by input of analog video signals generally requires image data storage areas of three pages. However, the display system of this embodiment can perform page switching control without problem also in cases where image data storage areas of different pages are allocated for different display planes, such as image data storage areas of two pages allocated for a display plane for displaying graphic images having been subjected to drawing processing, and image data storage areas of three pages allocated for a display plane for video output.

According to the display system of this embodiment, since page switching setting is performed using commands interpreted and executed by the drawing unit 20 or values set in registers, the load on the CPU 1 is not increased to control display switching. Particularly, in a system in which the drawing unit 20 performs drawing processing to generate image data according to a display list generated for each of display planes, such as a car navigation system, display switching control not using drawing commands requires that the CPU 1 controls which display planes are to be subjected to display switching at each termination of drawing processing of one display list, so that the load on the CPU 1 increases. In a navigation system, since the CPU 1 measures current positions and performs input-output control and other operations all the time and therefore cannot use so much time for display control processing, and high-performance CPU 1 cannot be used in terms of costs, it is very useful that display switching control can be performed without increasing the load on the CPU 1 as in the embodiment described previously.

Although the invention made by the inventor has been described in detail based on an embodiment, it goes without saying that the present invention is not limited to the embodiment and may be modified in various ways without departing from the scope and sprit of the present invention.

For example, although, in the embodiment, the setting of switching to a page from which image data is read is performed by a TRAP command indicating the termination of drawing processing, the same switching setting may be performed by other commands and dedicated control commands.

In the embodiment, the drawing attribute register 201 is provided with automatic switching mode enable bits D00 to D07 for deciding the validity of display switching enable bits D0 to D7 of a TRAP command. However, the automatic switching mode enable bits D00 to D07 may not be used so that the setting of switching to a page from which image data is read is performed by only the display switching enable bits D0 to D7 of a TRAP command.

Alternatively, the display switching enable bits D0 to D7 of a TRAP command may not be used so that display switching setting is performed by only the automatic switching mode enable bits D00 to D07 of the drawing attribute register 201. In this case, page switching setting may be automatically performed for display planes with automatic switching mode enable bits D00 to D07 set at enable "1", at the termination of drawing.

In the above-described embodiment, display planes with which the display switching enable bits D0 to D7 and the automatic mode enable bits D00 to D07 correspond are fixed in advance. However, a setting register for setting a correspondence relationship between the bits and plural display planes may be provided and the correspondence relationship may be changed dynamically or statically.

Figure 9:
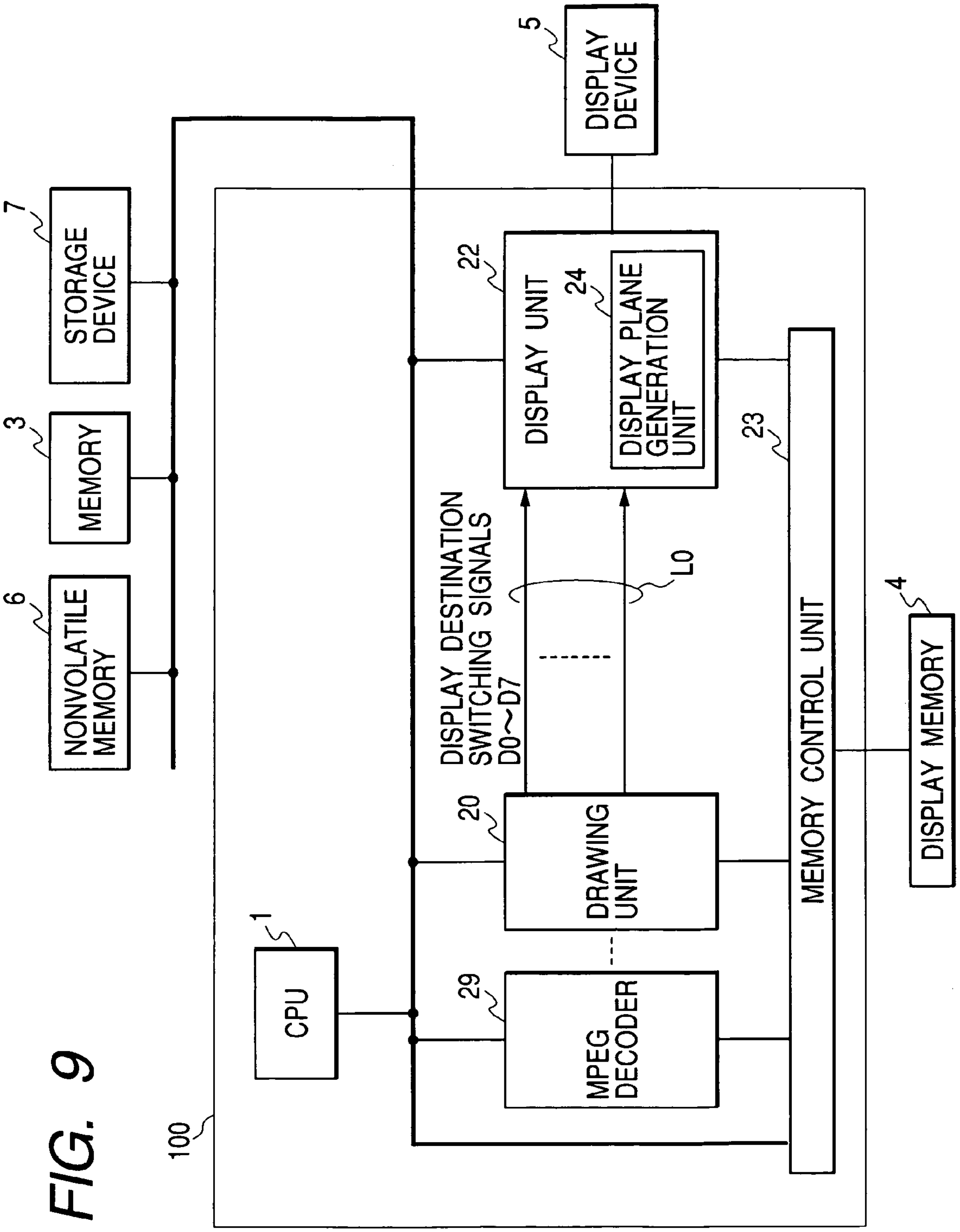
FIG. 9 is a block diagram showing another configuration of a display system to which the present invention is applied.

FIG. 9 shows another configuration of a display system to which the present invention is applied.

Although, in the above-described embodiment, the display control device 2 is configured with one chip, as shown in FIG. 9, a microcomputer 100 with the CPU 1, the drawing unit 20, and the display unit 22 disposed on one chip may be mounted in a car navigation system. The semiconductor memory 3 and the display memory 4 to provide working areas of the CPU 1 may be configured with one memory without being separate from each other.

Although, in the above-described embodiment, the drawing unit 20 is shown as image data generating means, various configurations may be applied, such as an MPEG (Motion Picture Experts Group) decoder 29 that can expand image data of plural video pictures in image data storage areas of plural display planes. In cases where the present invention is applied with the MPEG decoder 29 as image data generating means, page switching setting for each display plane may be performed independently at the termination of expansion processing of image data of one screen.

Also in a display system that makes compound display of drawing graphics, MPEG moving pictures, and images by video input on plural display planes, by independently performing the setting of switching to a read page for each of the display planes, the same effect can be obtained. For example, in a case where image display of video input is made at different display speeds, or in a case where image display of MPEG moving pictures having different frame rates depending on compression systems is made, the present invention is effective because page switching timing is different depending on display planes.

Although the invention made by the inventor has been described with respect to a case where it is applied to a car navigation system, which is an application field of the present invention, the present invention is not limited to the car navigation system. The present invention can be widely used for various display systems such as a handy navigation system and PDA (Personal Digital Assistant).

Effects obtained by representative examples of the invention disclosed in the present patent application will be briefly described.

According to the present invention, in a display system in which image data storage areas of plural pages are allocated for each of display planes, display switching is performed only for display planes whose display contents have been updated, or display switching is performed at the same time for two or more related display planes, so that versatile and redundancy-free, optimum display switching control can be performed.

Since display switching setting can be performed using commands executed by a display control device, display switching can be performed at appropriate timing without increasing the load of a CPU responsible for system control.

What is claimed is:

1. A display control device comprising:

an image data generating unit for generating image data for a plurality of display layers according to a series of command;

an image data storage unit for storing generated image data respectively in storage areas of a memory unit, the storage areas corresponding to the display layers; and a display processing unit for reading image data of the plurality of display layers stored in the memory unit to superimpose the image data, converting the image data into display output signals, and setting a display switching information in accordance with enable information included in a first command in the series of commands, wherein the display switching information indicates whether or not the storage area from which the image data is read is switched, wherein the display processing unit reads the image data of one or more display layers selected by the display switching information, the one or more display layers to be superimposed on a display screen of a display device, in response to the display control device receiving a display vertical synchronous signal of the display device, and wherein the first command is for indicating termination of generation of image data for one display layer.

2. The display control device according to claim 1, wherein the first command is for indicating termination of generation of image data for one display layer includes a plurality of display switching enable bits indicating the display switching information for each of the plurality of display layers, and wherein the display processing unit is operable to switch the storage area according to the display switching enable bits.

3. The display control device according to claim 2, wherein information of the first register is set according to the display switching enable bits.

4. The display control device according to claim 1, further comprising a first register for storing information indicating the display switching information, wherein the display processing unit is operable to switch the storage areas according to the information of the first register.

5. The display control device according to claim 4, further comprising an address register for storing the addresses of a plurality of storage areas in which the image data of each display layer is stored, wherein the display processing unit reads image data indicated by an address selected from the address register based on information of the first register.

6. A microcomputer comprising:

a central processing unit;

a display control device for performing drawing processing and display control; and a memory, wherein the display control device includes a display unit that controls display information, which is in accordance with operated information of a first command supplied by the central processing unit, indicating storage destinations of image data to output display signals to a display device connected to the outside, wherein the display unit includes a plurality of display plane processing units each using image data of a plurality of display planes that is capable of being displayed in a superimposed form on a display screen of the display device, wherein the display plane processing units include a plurality of pieces of display information indicating the storage destinations of image data of corresponding display planes, wherein the display control device is capable of updating the display information used in the plural display plane processing units after receiving a first instruction indicating the termination of drawing processing, wherein the display unit is operable to switch the storage destinations of image data of display planes in response to the display control device receiving a display vertical signal of the display device, and wherein the first command is for indicating termination of generation of image data for one display plane.

7. The microcomputer according to claim 6, wherein the display information used in the plural display plane processing units is updated at timing synchronous with the display transition synchronous signal of the display device.

8. The microcomputer according to claim 6, wherein the first instruction includes information for updating the display information.

9. The microcomputer according to claim 6, wherein the display information is address information of storage unit in which image data is stored.

10. The microcomputer according to claim 6, wherein two or more pieces of the display information used in the display plane processing units is capable of being updated at the same time in response to the first instruction being executed by the display control device.

11. A navigation system comprising:

the display control device comprising:

an image data generating unit for generating image data for a plurality of display layers for each of the display layers according to a series of commands;

an image data storage unit for storing generated image data respectively in storage areas of memory unit, the storage areas corresponding to the display layers; and a display processing circuit for reading image data of the plurality of display layers stored in the memory unit to superimpose the image data, and converting the image data into display output signals, and setting a display switching information in accordance with enable information included in a first command in the series of commands, wherein the storage areas from which image data is read are capable of switching for each display layer by the display processing circuit;

a central processing unit for generating the series of commands executed by the display control device or data;

a memory unit for storing image data generated by the display control device;

a display device; and a memory device for storing map information, wherein image data is generated by the display control device according to the map information read from the memory device and a map is displayed on the display device, wherein the display switching information indicates whether or not the storage area from which the image data is read is switched, wherein the display processing circuit reads the image data of one or more display layers selected by the display switching information for superimposing to display on a display screen of a display device in response to the display control device receiving a display vertical synchronous signal of the display device, and wherein the first command is for indicating termination of generation of image data for one display layer.

* * * * *